United States Patent
Thakur

(10) Patent No.: US 7,009,736 B2
(45) Date of Patent: Mar. 7, 2006

(54) TILE MAP BASED MULTI-LEVEL SUPERCELL SCREENING

(75) Inventor: Vivek Kumar Thakur, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1004 days.

(21) Appl. No.: 09/998,784

(22) Filed: Dec. 3, 2001

(65) Prior Publication Data

US 2002/0118393 A1    Aug. 29, 2002

Related U.S. Application Data

(60) Provisional application No. 60/257,789, filed on Dec. 22, 2000.

(51) Int. Cl.
*H04N 1/405* (2006.01)

(52) U.S. Cl. .................................... 358/3.06; 358/3.23

(58) Field of Classification Search ................. 358/1.9, 358/3.06, 3.13, 3.2, 3.23, 534–536; 382/270; 345/596–597
See application file for complete search history.

(56) References Cited

U.S. PATENT DOCUMENTS

| 4,675,831 | A | * | 6/1987 | Ito et al. ..................... 345/597 |
| 5,305,118 | A |   | 4/1994 | Schiller et al. |
| 5,542,029 | A |   | 7/1996 | Karlsson |
| 5,587,811 | A | * | 12/1996 | Liguori ....................... 358/3.2 |
| 5,642,439 | A | * | 6/1997 | Sato et al. ................. 358/3.23 |
| 6,081,349 | A | * | 6/2000 | Ebitani et al. ............... 358/3.2 |

FOREIGN PATENT DOCUMENTS

| EP | 0 427 380 A | 5/1991 |
| EP | 0 634 862 A | 1/1995 |

* cited by examiner

*Primary Examiner*—Scott A. Rogers
(74) *Attorney, Agent, or Firm*—Robert D. Marshall, Jr.; W. James Brady, III; Frederick J. Telecky, Jr.

(57) ABSTRACT

This invention is a screening method. The input image is divided into a plurality of supercells. These supercells are divided into a plurality of individual cells. An expanded cell is defined larger than each of the individual cells. A map of an input gray scale tone to an output gray scale tone is defined for each pixel of the expanded cell. The screening takes place for each pixel of the input image. First the method determines a pixel of the expanded cell corresponding to the input pixel. Then the output gray scale tone corresponding to the pixel of the expanded cell is recalled.

4 Claims, 4 Drawing Sheets ized as a two dimensional
TILE MAP BASED MULTI-LEVEL SUPERCELL SCREENING

This application claims priority under 35 USC § 119(e)(1) of Provisional Application No. 60/257,789, filed Dec. 22, 2000.

TECHNICAL FIELD OF THE INVENTION

The technical field of this invention is raster image processing in computer printers.

BACKGROUND OF THE INVENTION

Screening is the process of rendering the illusion of continuous-tone pictures on displays that are only capable of producing digital picture elements. In the process of printing images, large gray levels of the input picture have to be simulated by the printing device to reproduce a perfect duplicate of the original image. However, in the printed image the pixel resolution can be limited to that which is perceivable by the eye. Hence by grouping the adjacent pixels it is possible to simulate a continuous tone in the image.

Screening may take place by a threshold method in one of two categories: bi-level threshold screening; and multi-level threshold screening. In bi-level threshold screening the (x,y) coordinates of the input pixel are used to index into a two dimensional m by n matrix. The individual entries in the matrix are gray level thresholds which are compared against the input pixel gray level. A binary value (0 or 1) is output based on the results of the comparison. Multi-level screening indexes into a three dimensional lookup table. This three dimensional lookup table is organized as a two dimensional preference matrix of size M by N. The preference matrix is a repeatable spatial tile in the image space. Each entry of the preference matrix has a number of the tone curve which has to be used for the position of (x,y). The tone curve is the compensation transfer function of the input pixel gray value range to within range of the printing process. The tone-curve transfer function is quantized based on a set of thresholds and stored in the form of lookup tables. The lookup tables each contain $2^b$ entries for an unscreened input pixel of size b-bits. All the $2^b$ entries contain the corresponding screened output pixel of size c-bits. This process provides a manner of translating the large dynamic range of the input image into the smaller dynamic range of the printer by mixing colors within the printer dynamic range.

In printer applications the digital nature of the pixel grid imposes constraints on screen angle and line frequency accuracy. A supercell based method helps in achieving higher accuracy for screen angle and screen frequency. The prior art method for the threshold based supercell screening requires significant amount of memory to store threshold array. For example, in a 4 bit marking system (0–15 output gray levels), the memory required to store threshold arrays for a supercell of size 128 by 128 is 4 M bytes.

The size of the supercell is constrained by the availability of memory space for storage of threshold arrays. Thus compromises the ability to meet the requested screen angle and frequency. This turn affects the output image quality. In addition, it not possible to completely cache such threshold arrays in many system configurations, which affects the performance of screening.

SUMMARY OF THE INVENTION

This invention is a screening method. The input image is divided into a plurality of supercells. These supercells are divided into a plurality of individual cells. An expanded cell is defined larger than each of the individual cells. A map of an input gray scale tone to an output gray scale tone is defined for each pixel of the expanded cell. The screening takes place for each pixel of the input image. First the method determines a pixel of the expanded cell corresponding to the input pixel. Then the output gray scale tone corresponding to the pixel of the expanded cell is recalled.

BRIEF DESCRIPTION OF THE DRAWINGS

These and other aspects of this invention are illustrated in the drawings, in which.

DETAILED DESCRIPTION OF PREFERRED EMBODIMENTS

This invention provides an alternate method to represent threshold information for supercell method which results in a 50 to 100 times reduction in memory requirements. This invention doesn't increase the processing requirement.

The large cell of the supercell is divided into smaller individual cells. The individual cells in the supercell differ in shape and size, but have the same average cell size. The threshold information for individual cells are captured in an expanded gray scale map and a Tile map for the supercell is created. The pixel are screened using this tile map and expanded gray scale map.

This invention results in reduced memory requirement for screening thus reduced cost for the system. This invention also improves the performance compared to conventional system because it will generally be possible to cache complete threshold arrays.

Figure 1:
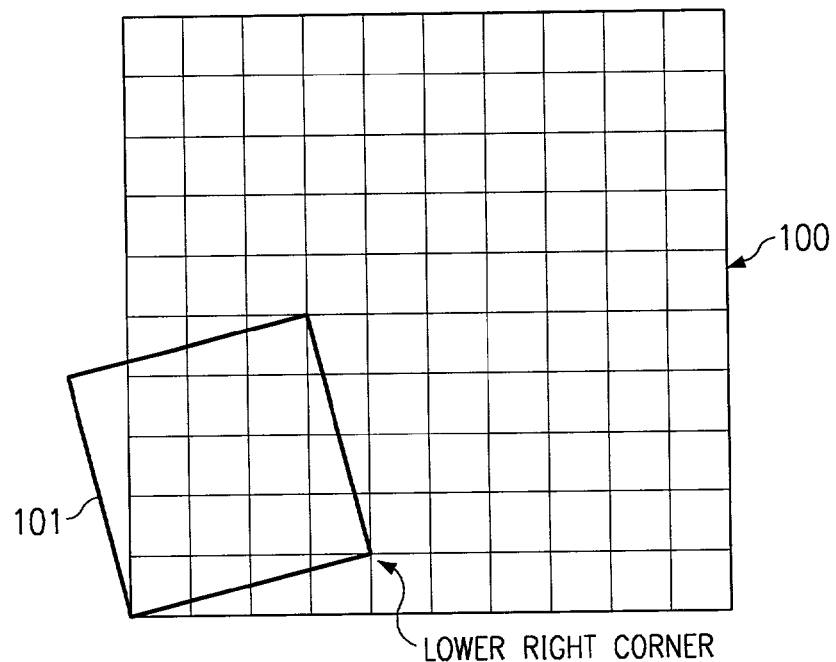
FIG. 1 illustrates the prior art superposition of a screen supercell on the source array.

In printer applications the digital nature of the pixel grid imposes constraints on screen angle and line frequency accuracy. A supercell based method helps in achieving higher accuracy for screen angle and screen frequency. Assume that the desired performance includes a screen angle of 15 degrees and a screen frequency of 150 lines per inch. FIG. 1 illustrates the screen supercell 101 superimposed on the source array 100. The parameters of the supercell are listed in Table 1.

TABLE 1

|   | Tile Lower Right Corner | Angle | Frequency LPI |
|---|---|---|---|
| 1 | 4,1 | 14.03° | 145 |
| 2 | 8,2 | 14.03° | 147.71 |
| 3 | 124,33 | 14.90° | 149,63 |

Note that larger supercells can provide better fit to the desired angle because the quantization error is smaller.

The large cell of the supercell 101 is divided into smaller individual cells. The individual cells in the supercell differ in shape and size, but have the same average cell size. The supercell size is chosen to better approximate the requested screen angle and frequency. In cases where a single cell can perfectly represent the requested frequency and screen angle, no improvement is gained by using a supercell.

Figure 2:
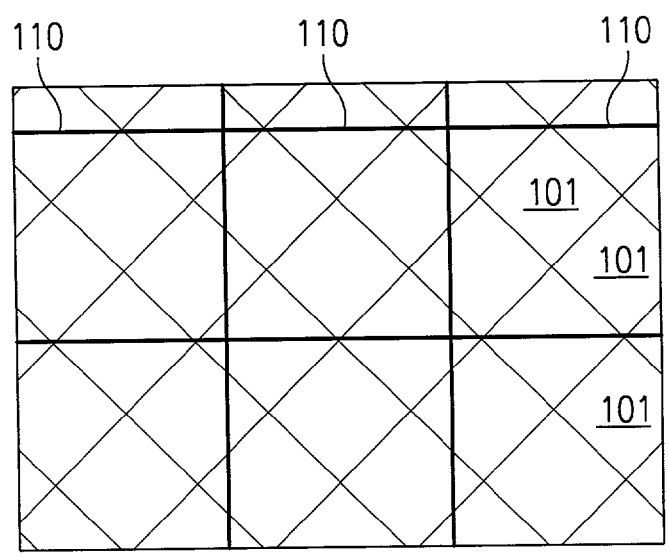
FIG. 2 illustrates the prior art organization of supercells into supertiles.

FIG. 2 illustrates organization of supercells 101 into supertiles 110. During screening supercells 101 are converted into a rectangular tile called the supertile 110. The supertile 110 stores the threshold information for the supercell 101 and simplifies the data access for screening. The following figures show the typical tiling scheme.

Figure 3:
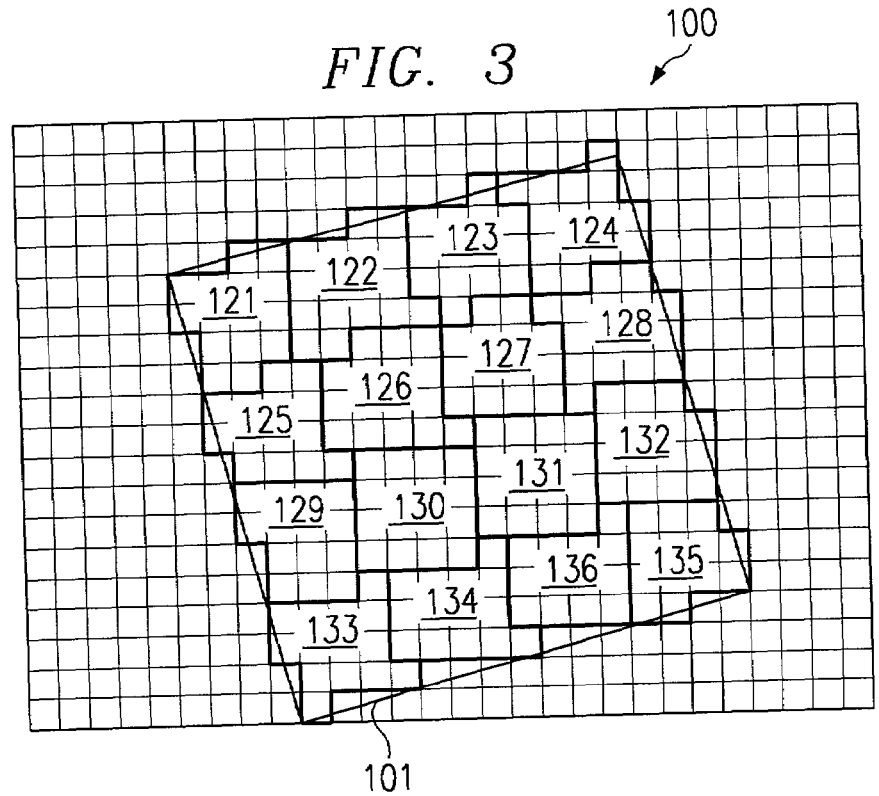
FIG. 3 illustrates the division of a supercell into a number of individual cells.

FIG. 3 illustrates the division of supercell 101 into a number of individual cells 121 to 136. The large cell called supercell 101 is selected for better accuracy of screen frequency and screen angle. The four corners of supercell 101 fall on the grid and its outline is defined. The individual cells 121 to 136 are fitted into supercell 101. The individual cells 121 to 136 vary in size and shape however the average cell size is constant.

Figure 4:
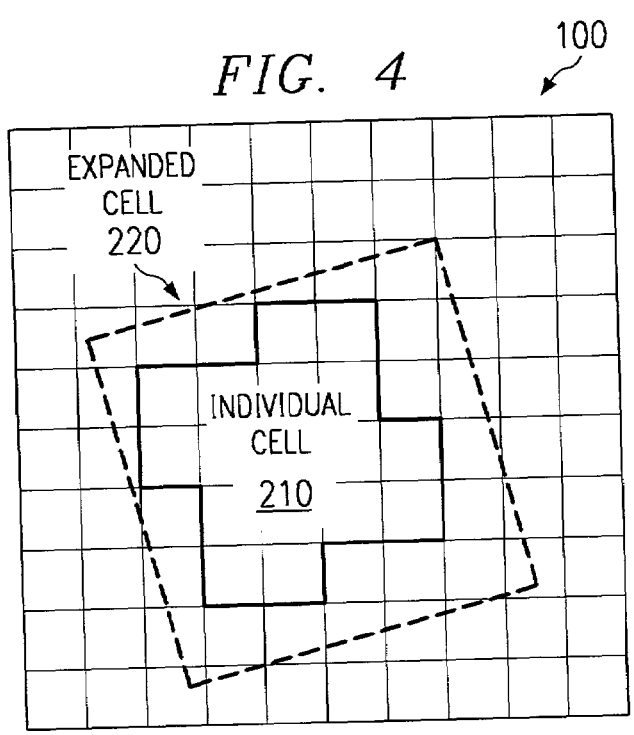
FIG. 4 illustrates the definition of an expanded cell overlaying one of the individual cells.

FIG. 4 illustrates the definition of an expanded cell overlaying one of the individual cells. The individual cells 121 to 136 in supercell 101 vary in shape and size. However the variance is within one pixel width on all four sides of the ideal cell 210. We can define an expanded cell 220 which has one extra pixel width on all four sides of the ideal cell 210. All individual cells 121 to 136 of supercell 101 can be placed centered in this expanded cell 220 and they will fit into it. For example, if the ideal cell size in m×m, then the expanded cell size is (m+2)×(m+2). Thus for an ideal cell of size of 4 by 4, the expanded cell will be of size 6 by 6.

Figure 5:
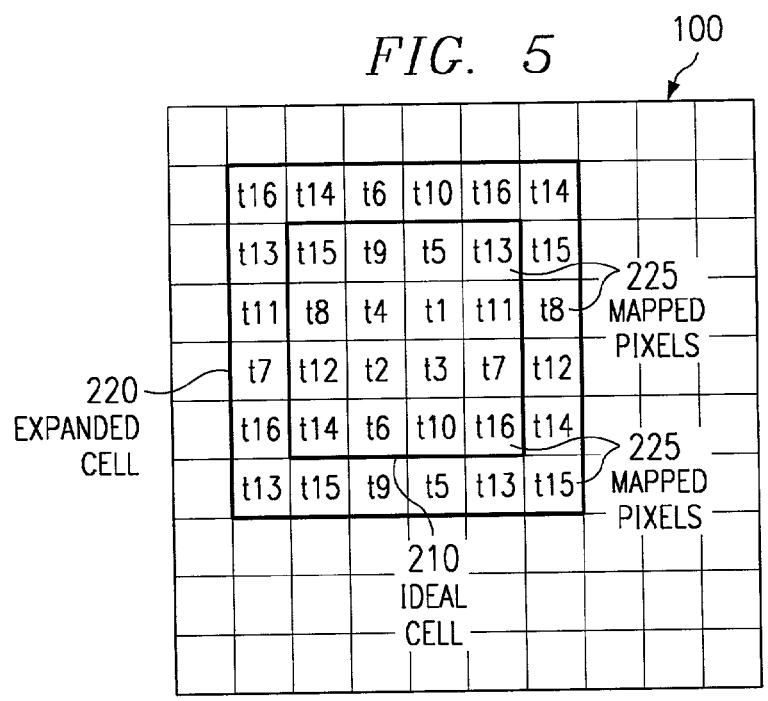
FIG. 5 illustrates the mapping of pixels of the expanded cell.

FIG. 5 illustrates the use of expanded cell 220. The threshold function 225 is defined for the expanded cell 220. Each pixel in expanded cell 220 has a corresponding threshold function 225. While defining threshold function 225 care is taken for the change in shape and size of individual cells 121 to 136. It may result in pixels on a boundary of expanded cell 220 having same threshold values as some of the pixels in ideal cell 210. The expanded cell 220 can represent threshold information for every individual cell 121 to 136 in supercell 101.

One method to assign threshold values to the pixels on the boundary of expanded cell 220 is described. The pixels inside ideal cell 210 don't require any special handling, they can be assigned threshold values in the conventional method.

The expanded pixel cell coordinates for a pixel is its coordinate in expanded cell 220 when the individual/ideal cell to which it belongs is placed in the center of expanded cell 220. A pixel with coordinates of (x,y) in ideal cell 210 will have expanded cell coordinates (x+1, y+1).

The expanded boundary pixels are assigned threshold values the same as that of pixels of ideal cell 210 on the opposite side boundary. For an ideal cell of size m by m, Table 2 provides the mapping of pixel on expanded cell boundary to the pixel in the ideal cell for threshold assignment.

TABLE 2

|   | Mapped Pixel in Ideal Cell | |
|---|---|---|
| Boundary Pixels | Ideal Cell Coordinate | Expanded Cell Coordinate |
| (0, y) 0 < y <= m | (m − 1, y − 1) | (m, y) |
| (x, 0) 0 < x <= m | (x − 1, m − 1) | (x, m) |
| (m, y) | (0, y − 1) | (1, y) |
| (x, m) | (x − 1, 0) | (x, 1) |

FIG. 5 illustrates the threshold assignment for the expanded boundary pixels when the ideal cell size is 4 by 4.

In the conventional method, supercell 101 is converted into super tile 110 which is used for threshold data access during screening. This invention creates a tile map using a method similar to the standard method used for creating a super tile 110. The tile map is a two dimensional array having the same size as super tile 110. A field in tile map represents a pixel in supercell 101. The entries of the tile map give the position of the pixel in expanded cell 220, that is the expanded cell coordinates for the pixel with respect to the individual cell to which this pixel belongs. The tile map contains the indices to the expanded cell for all pixels in supercell 101. In contrast, the prior art super tile 110 contains the actual threshold values/arrays. In this invention, the threshold information is stored centrally in expanded cell 220 thus resulting a saving in memory requirement.

Figure 6:
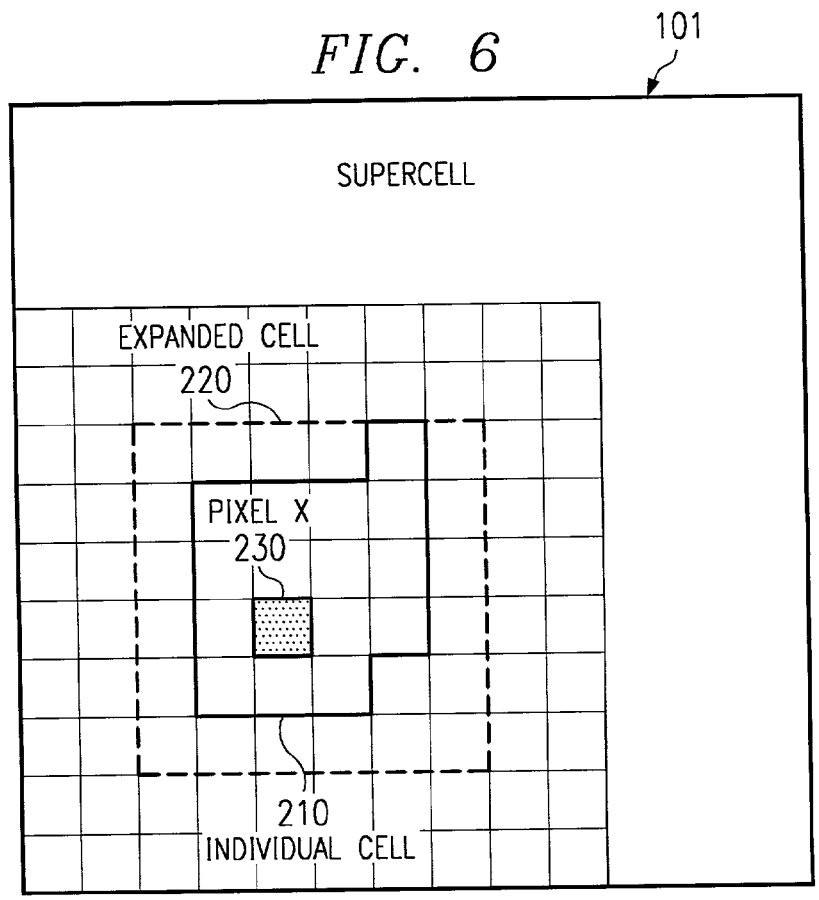
FIG. 6 illustrates the relationship between a supercell, an individual cell, the expanded cell 220 and an individual pixel.

FIG. 6 illustrates the relationship between supercell 101, an individual cell 210, expanded cell 220 and an individual pixel 230. The following describes the multilevel threshold screening algorithm based on the concepts of this invention. The tile map is a two dimensional array having the same size as supercell 101. An entry in the tile map has two fields: xpos; and ypos. The xpos field is the X coordinate of the pixel in expanded cell 220 when the respective cell 210 to which this pixel belongs is placed in the center of expanded cell 220. The ypos field is the Y coordinate of the pixel in expanded cell 220 when the respective cell 210 to which this pixel belongs is placed in the center of expanded cell 220. The grayscale map is a three dimensional array. Each entry in the grayscale map contains the output grayscale value for corresponding pixels in expanded cell 220 for an input grayscale value. A typical grayscale map would have the following three dimensions. The first dimension would range from 0 to 255 corresponding to the input grayscale value. The second dimension would have a range corresponding to the size of expanded cell in the X direction. The third dimension would have a range corresponding to the size of expanded cell in the Y Direction.

Screening using supercell 101 uses the following algorithm. Assume input pixel 230 has original coordinates (x,y) and an input grayscale of value $G_{in}$. First, is the computation of the image plane the index into tile map.

$X\_index=x/$(Tile Map Width)

$Y\_index=y/$(Tile Map Height)

Next, the pixel position in expanded cell 220 are determined.

$x\_ex$=TILE_MAP[$X\_index, Y\_index$] $xpos$ $y\_ex$=TILE_MAP[$X\_index, Y\_index$] $ypos$ Lastly, the output grayscale value is obtained from the tile map GRAY_MAP.

$G_{out}$=GRAY_MAP[$G_{in}, x\_ex, y\_ex$]

The relative memory requirements of the prior art and this invention are calculated as follows. Assume that the output resolution is 600 dots per inch (dpi). Assume also a 4 bit marking system (0–15 output gray levels), the memory required to store threshold arrays for a supercell of size 128 by 128 and an ideal cell size of 4 by 4 pixels. In the prior art method the threshold array size is 128×128×256 equals 4M elements. If each element occupies one byte the required memory is 4M bytes. Since the output is 4 bits, these could be packed two elements per byte. Thus a packed threshold array would require 2M bytes. According to this invention, the tile map X and Y coordinated could be packed into one byte, the most significant 4 bits storing the X position and least significant 4 bits storing Y Position. The required memory for the tile map is thus 128×128 bytes or 16K bytes. The grayscale map corresponds to the size of the expanded cell, in this example 6×6 bytes or 36 bytes. The Grayscale Map has 256 entries per pixel, thus requires 256×36 bytes or 9K bytes. The total memory requirement is the sum of the tile map and the grayscale map or 16K bytes plus 9K bytes or about 25K bytes. This invention thus reduces the memory required by a factor of 2M/25K or 81.92 times. This invention requires sequential accesses into two smaller tables, one two dimensional and on three dimensional, rather one access into a large three dimensional table. The computation requirements are about the same for these two techniques.

The tile map based supercell screening method offers efficient screening for raster image processing applications. The reduced memory requirements result in system cost reduction and at the same time enable bigger super cell size for better screen angle and screen frequency. It may be feasible to cache complete threshold arrays of this invention while the prior art method generally dis not allow caching the complete threshold arrays. Thus system performance may be greatly enhanced using this invention due to better cache usage. Therefore the tile map based supercell screening of this invention enables better quality image output at reduced system cost and it also makes screening module faster compared to conventional method.

Figure 7:
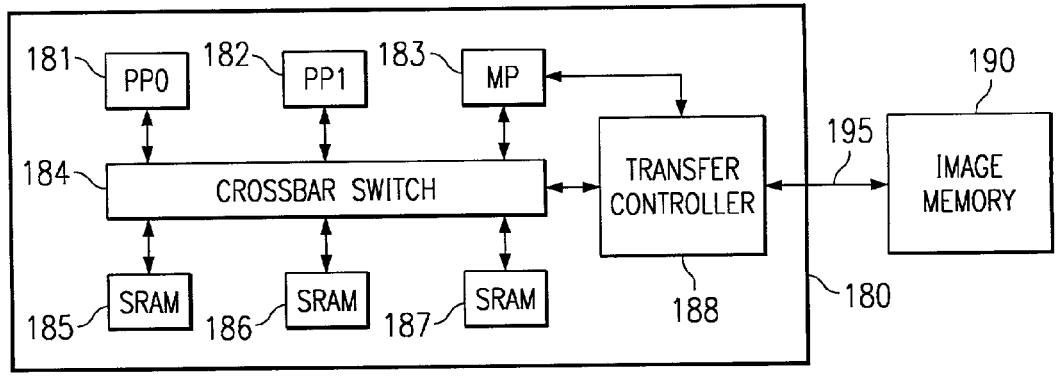
FIG. 7 illustrates a block diagram of a digital signal processor in an image data processing system according to this invention.

FIG. 7 illustrates a block diagram of a TMS320C82 digital signal processor (DSP) in an image data processing system according to this invention. The supercell tiled screening can be very efficiently implemented on a multiprocessor DSP such as the Texas Instruments TMS320C82. The basic architecture of this DSP is shown on FIG. 7.

The multiprocessor DSP is a single integrated circuit 180. Integrated circuit 180 a fully programmable parallel processing platform that integrates two advanced DSP cores DSP 181 and DSP 182, a reduced instruction set computer (RISC) master processor (MP) 183, multiple static random access memory (SRAM) blocks 185, 186 and 187, a crossbar switch 184 that interconnects all the internal processors and memories, and a transfer controller (TC) 188 that controls external communications. Transfer controller 188 is coupled to image memory 190 via bus 195. Note that transfer controller 188 controls all data transfer between integrated circuit 180 and image memory 190. Image data is stored in image memory 190.

In operation, the individual DSPs 181 and 182 can operate independently on separate supercells. Each DSP 181 and 182 signals transfer controller 188 to transfer a the tile map and the grayscale map from image memory 190 to the corresponding SRAM 185 and 186. The DSPs 181 and 182 perform the screening as described above and the screened image data is stored in the corresponding SRAMs 185 and 186. The screened data is transferred back to image memory 190 via transfer controller 188. Access by DSPs 181 and 182 and master processor 183 to SRAMs 185, 186 and 187 is mediated by crossbar switch 184. Master processor 183 is preferably programmed for high level functions such as communication with other parts not shown.

Figure 8:
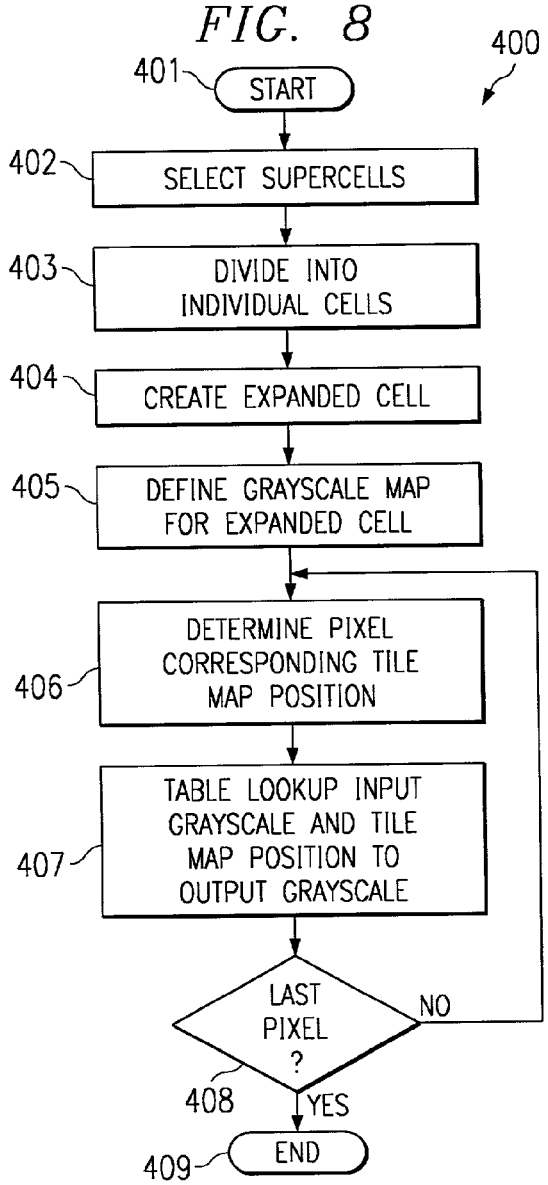
FIG. 8 is a flow chart summarizing the process of this invention.

FIG. 8 is a flow chart summarizing the process of this invention. Screening method 400 begins at start block 401. Iniitally, screening method 400 selects the supercells (block 402). This selection takes into account the desired angle and lines per inch resolution. Next screening process 400, divides the supercells into individual cells as illustrated in FIG. 3 (block 403). Next screening process 400, creates the expanded cell as illustrated in FIG. 4 (block 404). The final preliminary step in screening process 400 is defining the grayscale map for each pixel of the expanded cell (block 405). Screening process 400 then screens individual pixels. Screening process 400 determines the mapping of the individual pixel to the tile map (block 406). This requires identification of the supercell and the individual cell. The identifed individual cell is placed in the center of the expanded cell for the mapping. Screening process 400 then does a table lookup operation into the grayscale map. The X and Y position within the expanded cell and the input grayscale value are the indices into this three dimensional table. The data found at that table location is the output grayscale value. In a typical case, a higher resolution input grayscale value is mapped into a lower resolution output grayscale value that can be output by the printer. Screening process 400 tests to determine if this is the last pixel (block 408). If not, screening process 400 returns to block 406 to repeat for the next pixel. If so, screening process 400 is complete (block 409).

What is claimed is:

1. A method of approximating a gray scale tone in an input image with a different range image producer comprising the steps of:
dividing the input image into a plurality of supercells;
dividing each supercell into a plurality of individual cells;
defining an expanded cell larger that each of the individual cells;
defining a mapping of an input gray scale tone to an output gray scale tone for each pixel of the expanded cell;
for each pixel of the input image
determining a pixel of the expanded cell corresponding to the input pixel;
determining an output gray scale tone corresponding to the pixel input gray scale tone and the corresponding pixel of the expanded cell.

2. The method of claim 1, wherein:
said step of defining a mapping of an input gray scale tone to an output gray scale tone for each pixel of the expanded cell includes assigning grey scale tones for expanded cell boundary pixels the same as pixels on the opposite side boundary.

3. The method of claim 1, wherein:
said step of determining a pixel of the expanded cell corresponding to the input pixel includes
computation of the image plane the index into tile map, and
determining the input pixel position in expanded cell are determined based upon the computed index.

4. The method of claim 1, wherein:
said step of determining an output gray scale tone corresponding to the pixel input gray scale tone and the corresponding pixel of the expanded cell consists of accessing a lookup table memory having the input gray scale tone, the X position of the input pixel in the expanded cell and the Y position of the input pixel in the expanded cell as indices and having the output gray scale tone stored at the indexed location.

* * * * *